United States Patent [19]

Steckel et al.

[11] 3,878,024
[45] Apr. 15, 1975

[54] CONTINUOUSLY WRAPPED HOSE MAKING DEVICE

[75] Inventors: Elmer A. Steckel, Wheatridge;
William G. Schaffer, Englewood;
Roger A. Payne, Denver, all of Colo.

[73] Assignee: The Gates Rubber Company, Denver, Colo.

[22] Filed: Dec. 3, 1973

[21] Appl. No.: 420,991

Related U.S. Application Data

[62] Division of Ser. No. 220,945, Jan. 26, 1972, Pat. No. 3,813,314.

[52] U.S. Cl. ................. 156/428; 156/461; 156/468
[51] Int. Cl. ............................................... B31f 1/00
[58] Field of Search .......... 156/184, 187, 188, 195, 156/443, 438, 461, 463, 465, 464, 468, 428; 226/182–183, 184, 189

[56] References Cited
UNITED STATES PATENTS

| | | | |
|---|---|---|---|
| 1,748,264 | 2/1930 | Wikle | 156/438 |
| 1,886,639 | 11/1932 | Cadden | 156/187 X |
| 3,340,113 | 9/1967 | Burr | 156/438 X |
| 3,680,758 | 8/1972 | Kinnicutt | 226/183 |

*Primary Examiner*—Charles E. Van Horn
*Assistant Examiner*—David A. Simmons
*Attorney, Agent, or Firm*—H. W. Oberg, Jr.; Raymond Fink; Curtis H. Castleman, Jr.

[57] ABSTRACT

A device for continuously wrapping a strip of reinforcement to a tube, the device including two spaced-apart assemblies of cylindrical rollers where the cylindrical surfaces of the rollers of each assembly are respectively arranged to substantially contact first and second imaginary planes.

4 Claims, 9 Drawing Figures

CONTINUOUSLY WRAPPED HOSE MAKING DEVICE

This is a division of application Ser. No. 220,945, filed on Jan. 26, 1972, now U.S. Pat. No. 3,813,314.

BACKGROUND OF THE INVENTION

The invention relates to hose and a method and machine for making the same, but more particularily, the invention relates more to reinforcing hose by wrapping a strip of reinforcement therearound as distinguished from a pure spiral wrapping operation.

It is customary in the art of wrapped hose making to extrude a tube of polymeric material, such as natural or synthetic rubbers, over a mandrel. A strip of reinforcement impregnated with a polymeric material is then wrapped around the tube. Typically, the reinforcement is rubberized fabric that has been bias cut. The reinforcement is applied by rotating the tube or by wrapping reinforcement around the tube. A preferable method for applying a continuous reinforcement over a long length of tubing is disclosed in U.S. Pat. No. 2,984,262. As disclosed therein, strips of rubberized fabric are applied to a tube in predetermined sectional lengths. The tube is rotated as a strip of rubberized fabric is applied. Then, the tube is rotated in the opposite direction and advanced so a successive length of rubberized fabric may be applied in a similar manner. The ends of successive strips abut or overlap each other. Care must be taken to align the leading end of each successive strip so the leading end is in abatting relation with the edge of a previously wrapped strip of rubberized fabric. After insulating a cover over the fabric, the assembled hose is cured or vulcanized such as by the well known wrapped tape or lead press process.

While a hose having a continuous reinforcement may be produced by the method of U.S. Pat. No. 2,984,262, the process is slow. The reinforcement application step is intermittent as the tube is repeatedly rolled, advanced, and unrolled. Approximately 700 feet of five ply reinforcement may be applied per hour to a 0.375 inch tube. Care must be taken during the step of strip alignment to minimize irregularities at abutting end sections of successive strips. Possibility of reinforcement irregularities is prevalent throughout the hose at spaced intervals equivalent to the length of a reinforcement strip.

SUMMARY OF THE INVENTION

In accordance with the invention, it is proposed to speed up the hose wrapping process and eliminate the possibility of reinforcement irregularities at spaced intervals throughout the hose by deleting the steps of (1) repeatedly aligning each successive pre-cut strip of reinforcement, and (2) repeatedly rotating a section of a tube first in one direction and then in the opposite direction. By the process of the invention, a strip of reinforcement impregnated with a polymeric material, is continuously wrapped around a mandrel supported tube by passing the tube and fabric between two planes or assemblies of rollers. Each plane of rollers includes a plurality of rollers having axes which are substantially parallel to each other. The roller axes of one plane of rollers are offset at an angle from the axes of the other plane of rollers. As the tube and strip of reinforcement are passed between the two roller assemblies, the tube is continuously twisted and the reinforcement is continuously wrapped around the tube. The fabric is continuously and automatically applied at a slight helical angle about the tube. Reinforcement laps or abutments are eliminated at equally spaced intervals along the tube. The width of the reinforcement strip corresponds to the number of desired wraps necessary for a desired number of reinforcement plies. A cover is then applied over the reinforcement and the assembly is cured. Considerable economic savings are realized both in manual labor and production time. Also, the quality of the hose is improved as there is less chance for wrapping irregularities along successive segmented hose lengths.

Accordingly, it is an object of the invention to provide a method for continuously and automatically wrapping long lengths of hose tubing with reinforcement.

Another object of the invention is to provide a device for automatically and continuously wrapping hose tubing with a reinforcement strip.

It is another object of the invention to provide long lengths of hose having substantially uniform reinforcement throughout.

A further object is to provide an improved hose article and a method for producing the same.

It is a further object of the invention to provide a method for producing hose such that extended lengths of tubing may be wrapped continuously with strips of rubberized fabric without intermittently interrupting tube movement or the wrapping process.

These and other objects or advantages of the invention will become more apparent from reviewing the drawings and description thereof wherein.

DESCRIPTION OF A PREFERRED EMBODIMENT

Figure 1:
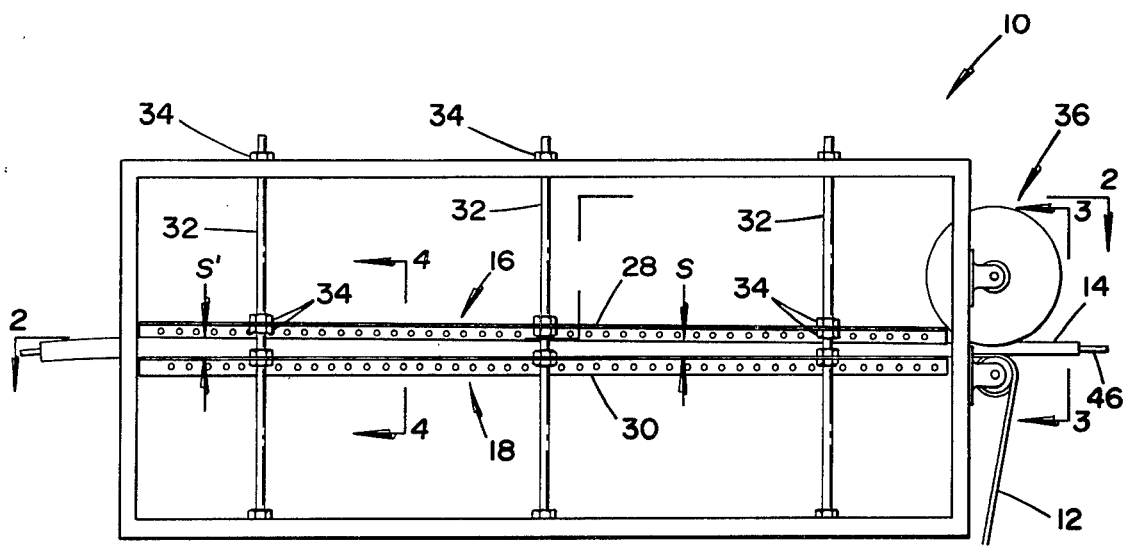
FIG. 1 is a side view of a roller device of the invention for wrapping strips of reinforcement around hose tubing.
Figure 2:
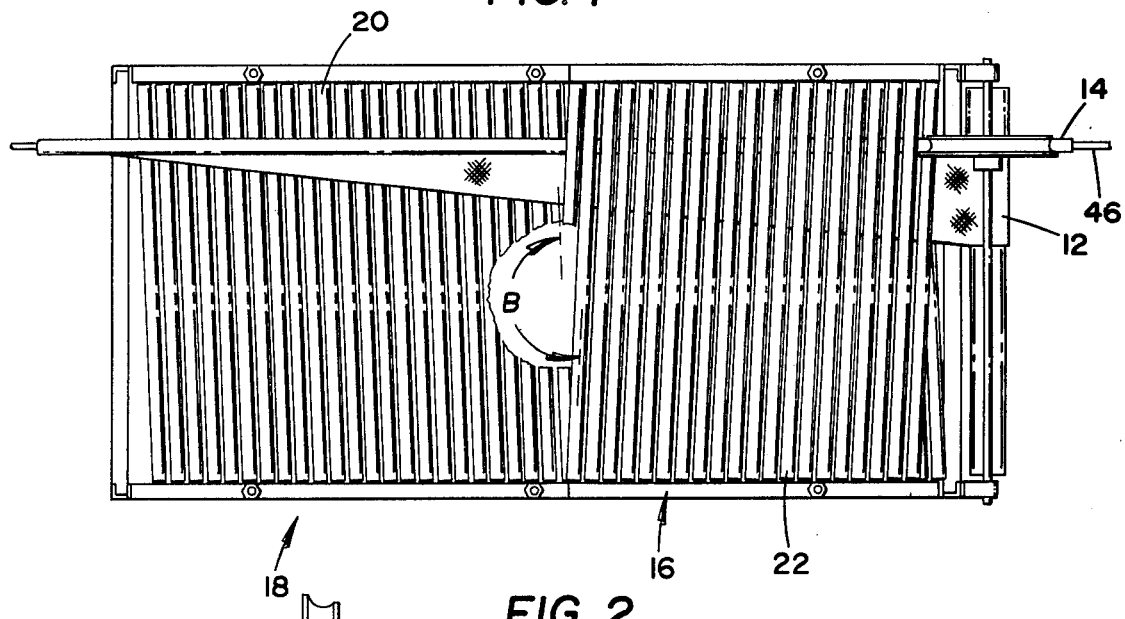
FIG. 2 is a view taken along the line 2—2 of FIG. 1 showing a first and second planar roller assembly and tubing being wrapped with reinforcement in accordance with the invention.
Figure 3:
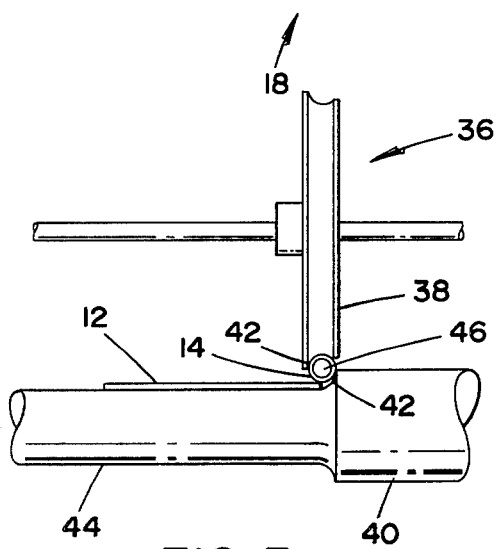
FIG. 3 is a view taken along the line 3—3 of FIG. 1 showing a tube and a strip of reinforcement aligned by a roller guiding means.
Figure 4:
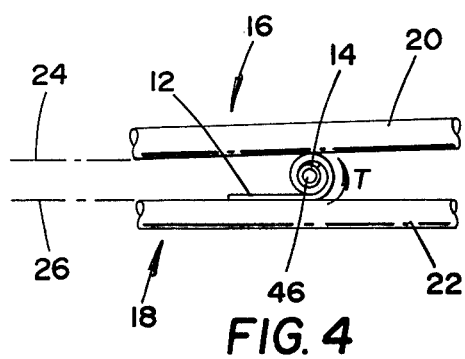
FIG. 4 is a view taken along the line 4—4 of FIG. 1 showing relative positions between the first and second planar roller assemblies.
Figure 5:
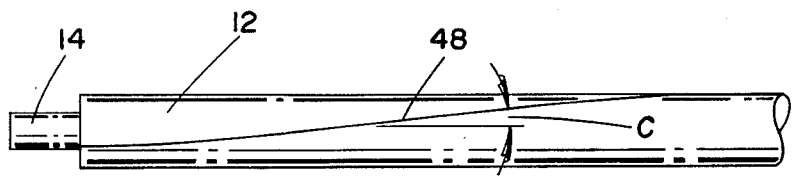
FIG. 5 is a side view showing tubing wrapped with reinforcement in accordance with the invention.

Referring to FIGS. 1–5, a hose wrapping apparatus 10 for applying a strip of reinforcement 12 around tubing 14 is shown. The apparatus 10 includes two roller assemblies 16, 18. Each assembly 16, 18 includes a plurality of rollers 20, 22 arranged to have their axes substantially parallel with each other. The rollers 20 of the first assembly 16 are arranged to have the roller surfaces substantially contact a first imaginary plane 24. Likewise, the rollers 22 of the second assembly 18 are arranged to have the roller surfaces contact a second imaginary plane 26. The imaginary planes 24, 26 are spaced-apart at predetermined amounts and the planes are generally parallel to a degree and in a manner which will later be explained. The rollers 20, 22 are supported in substantially parallel relationship by first 28 and second 30 frame members. The rollers 20, 22 extend generally transversely of the frame members 28, 30 forming an angle B in relation to each other that is generally less than 180° and greater than 90° but preferably is between 170° and 150°. Rollers 20, 22 of the first and second assemblies 16, 18 extend at opposite angles from each other in relation to the frame. Preferably, the rollers 16, 18 are arranged at equal but opposite angles in relation to the frame. The rollers may be fixed at a predetermined angle in relation to each other, or preferably, the angle is adjustable. For example, the rollers may be made adjustable by providing an articulated frame member and supporting the rollers with spherical bearings whereby a longitudinal displacement of a frame member results in changing the roller angle.

The roller assemblies are positioned in a spaced-apart relationship by the frame members 28, 30. Preferably, one roller assembly 18 is held in a permanent planar position by frame member 30 while the plane 24 of the remaining roller assembly 16 is adjustable both longitudinally and transversely. Adjustments are desired to accommodate hose tubes of different diameters or reinforcements of different plies or thickness. The adjustment mechanism may be of any desired type. Threaded rods 32 and nuts 34 may be used as a support for the roller assembly frames 28, 30. Adjusting the nuts 34 along the rods 32 locates the roller assembly 16 at various planar positions. Should a more sophisticated adjustment system be desirable to adjust the roller assembly, hydraulic or pneumatic cylinders may be used.

A tubing and reinforcement guiding means 36 is provided near one end of the wrapping apparatus 10 for properly positioning the hose tube 14 and reinforcement 12 for entry between the two roller assemblies 16, 18. The guiding means 36 is not essential but it is desirable for the purpose of facilitating high speed wrapping that is substantially free of defects. The guiding means 36 includes two rollers 38, 40 or wheels having a rounded step 42 for receiving a curved portion of the hose tube. One roller 40 has a cylindrical portion 44 adjacent the curved step 42 for receiving the strip of reinforcement.

When hose is to be fabricated with the aid of the wrapping apparatus 10, a polymeric tube 14 is formed over a flexible mandrel 46 by any conventional process such as by cross-head extrusion. Polymeric materials which are normally used for tubing include the natural or synthetic rubbers or plastic. It is desirable that the polymeric material be plyable for the wrapping operation. The tube 14 may be cured or uncured. When rubber is used, it is typical to delay curing until after the hose has been fabricated.

Figure 6:
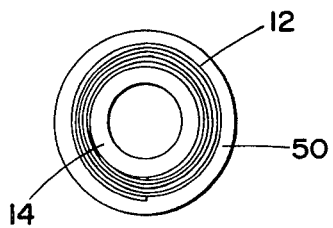
FIG. 6 is a cross-sectional view of a finished hose.

Strips of reinforcement 12 are prepared in a usual manner such as by impregnating a woven textile fabric with a polymeric material. Typically, a rubberized reinforcement is prepared by calendering a square woven fabric with rubber. Rubberized fabric may be cut along the bias to form strips of bias cut reinforcement, or tubularly woven fabric may be helically cut to form continuous lengths of bias fabric. When tubularly woven fabric is used, the step of helically cutting is accomplished prior to the step of calendering. It is not necessary to pre-cut the strips to a predetermined length. Strips of unlimited length may be prepared and stored on rolls external of the wrapping apparatus. The width of the strip may be dimensioned as desired so as to be spirally wrapped around the tubing 14 a number of times to form a desired number of plies. For example, the fabric strip may have a width substantially equal to five times the circumference of the hose so as to form five plies of reinforcing material about the tubing such as depicted by FIG. 6.

The tube 14 and reinforcement strip 12 are positioned between the rollers 38, 40 of the guiding means 36. One edge of the reinforcement strip is held in a tangential relationship with the tubing 14 by rollers 38, 40. When uncured rubbers are used, the reinforcement is "stiched" to the tubing by contact pressure generated by the rollers. The spacing S between the roller assemblies 16, 18 is adjusted to receive the particular diameter of tubing desired to be wrapped with reinforcement. Adjustment for different diameters may be accomplished by pivoting the plane 24 of one roller assembly 16. The spacing along the longitudinal axes of the wrapping apparatus is adjusted to be slightly divergent. The spacing S between the rollers where the tubing enters is slightly less than the spacing S' where the tubing exits. The divergent spacing makes room for an ever increasing reinforcement thickness which occurs as the tubing progress through the wrapping apparatus and is continuously wrapped with reinforcement. Thus for the purpose of this disclosure, the term "generally parallel" as it refers to roller assemblies, includes the adjustment tolerances required for reinforcement thickness and changes in hose diameter.

Tubing 14 and reinforcement 12 are directed from the guiding means 36 and to the rollers 20, 22 to start the wrapping operation. The tubing 14 is pulled through the rollers at preferably a constant speed. The rollers 20, 22 of both assemblies 16, 18 are in pressure contact with the tube and reinforcement. Since the rollers 20 of one assembly are aligned at a predetermined angle B with the rollers 22 of the remaining assembly, the pressure contact of the rollers combine to generate a torsional force T which twists the tube while simultaneously wrapping reinforcement 12 therearound. A square woven reinforcement is slightly pantographed, as it is wrapped about the tubing and the edge of the fabric strip defines a slight helix 48 about the tubing 14. The helical angle C defined by the reinforcement strip is preferably maintained at a minimum to achieve maximum efficiency for a square woven reinforcement. The angle B between the rollers and the friction between the rollers 20, 22 and wrapped tubing determine the helical angle of the reinforcement, or in other words, the twist of the tubing. A low angle B between the rollers will develop a high tubing twist while a high angle B between the rollers develops a low tubing twist. Should the angle B be too small, for example less than 90°, the twisting may be so great that the tension required to pull the tubing through the rollers would pull the tubing apart. When the angle B approaches 180°, very little twisting is accomplished and the length of the roller assemblies becomes excessively long. Angles B between 150° and 166° have proven satisfactory for 0.375 inch diameter tubing. It is readily seen that if there is a large amount of slippage between the rollers and tubing, the reinforcement will be applied at a low helical angle. Should there be essentially no slippage between the tubing and rollers, there will be a direct correlation between the roller Angle B and the helical Angle C of the reinforcement 12.

Perhaps the significance of the invention may best be expressed in terms of how fast tubing may be wrapped. It has been experimentally determined that 3,000 to 6,000 feet per hour of 0.375 inch diameter tubing may be wrapped with five plies. Under conventional wrapping methods approximately 700 feet per hour of the same tubing may be wrapped with five plies.

Once the reinforcement has been wrapped or plied, a cover 50 is formed over the subassembly using conventional methods. For example, a cover may be applied with a crosshead insulator or by wrapping or spiralling. The entire assembly is then cured. In the case of rubber, curing may be accomplished for example, with either the lead press or open steam curing process.

The resulting product is long lengths of hose having a wrapped reinforcement which extends continuously throughout the hose. The reinforcement defines a slight helix having an angle C of preferably less than 15 degrees. When square woven bias cut fabric is used as the reinforcement, it is pantographed an amount which is a function of the helical angle C. There are no overlapping splices occurring at predetermined intervals as there are in hose wrapped according to prior art methods.

ADDITIONAL SPECIES

Figure 7:
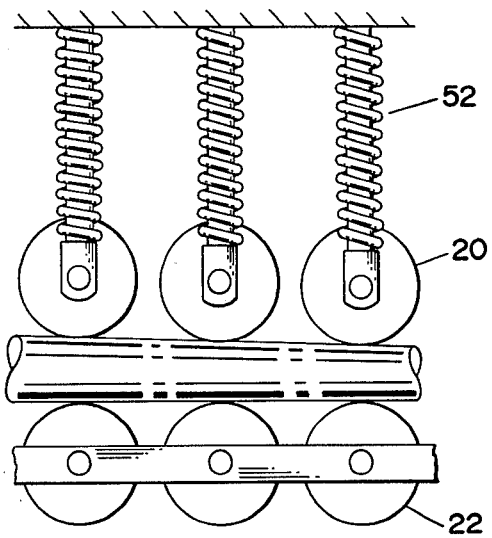
FIGS. 7 through 9 are alternate forms of the invention depicting alternate ways for suspending the rollers.
Figure 8:
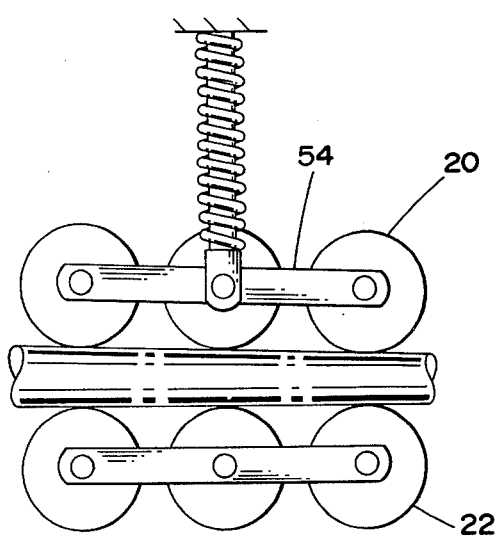
Figure 9:
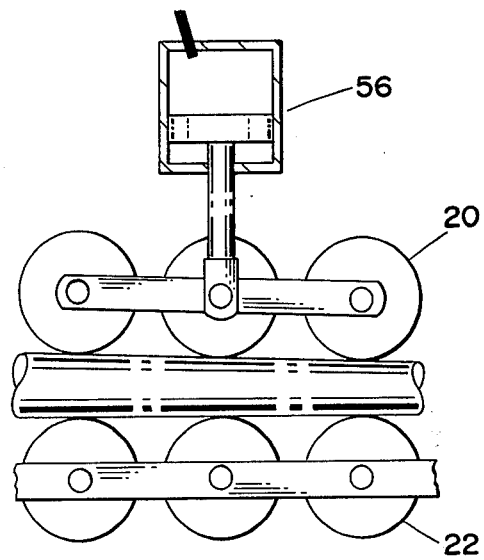

Referring to FIGS. 7–9 the rollers 20, 22 may be mounted and suspended as desired to assure proper pressure contact with the tubing, and to accommodate any planar adjustment for the roller assemblies. For example, each roller 20 may be individually biased 52 toward the tubing or a plurality of rollers may be bogied 54 and biased toward the tubing. Alternately, pneumatic or hydraulic cylinders 56 may be used to position the roller assemblies toward or away from each other.

Heretofore, the exemplary method for making hose in accordance with the invention has included the use of a flexible mandrel. Although the flexible mandrel is preferred for rendering positive support to the tubing, the mandrel is not essential. The tubing may be pressurized in accordance with standard hose building techniques, or a high-modulus, self-supporting tubing may be used.

The foregoing detailed description was made for purpose of illustration only and it is not intended to limit the scope of the invention which is to be determined from the following claims.

What is claimed is:

1. A device for wrapping a flattened strip of reinforcement to tubing comprising:
   a first roller assembly including a plurality of cylindrical rollers having their axes aligned substantially parallel with each other and having cylindrical surfaces arranged to substantially contact a first imaginary plane;
   a second roller assembly including a plurality of cylindrical rollers having their axes aligned substantially parallel with each other, the axes of the rollers of the second assembly arranged to form a predetermined angle in relationship to the axes of the rollers of the first roller assembly and the rollers of the second assembly having cylindrical roller surfaces arranged to substantially contact a second imaginary plane spaced-apart from and generally parallel to the first plane, the cylindrical rollers of the first and second assemblies adapted to make substantially tangential contact with the tube and wrapped fabric strip; and
   means for guiding the strip of reinforcement and tubing generally obliquely to the rollers of the first and second assemblies and along a path where initially the strip is substantially parallel to the tube and where the fabric strip is fed substantially tangentially to the cylindrical roller surfaces of one of the roller assemblies whereby said cylindrical rollers are adapted to lend support to the fabric strip.

2. A device as set forth in claim 1 and further including means for adjusting the spaced relationship between said first and second imaginary planes.

3. A device as set forth in claim 1 wherein said guiding means includes:
   a stepped cylindrical roller arranged obliquely to the rollers; and
   a grooved wheel positioned juxtaposed at a predetermined distance from the step of the roller, said wheel having an axis aligned generally parallel to said stepped cylindrical roller.

4. A device as set forth in claim 3 and further including means for adjusting the spaced relationship between said stepped cylindrical roller and said grooved wheel.

* * * * *